Oct. 24, 1961

JOSEPH REDER
ALSO KNOWN AS JOSEF REDER
PULSE JET ENGINE 3,005,310

Filed May 1, 1956

INVENTOR

BY

BERNARD OLCOTT.

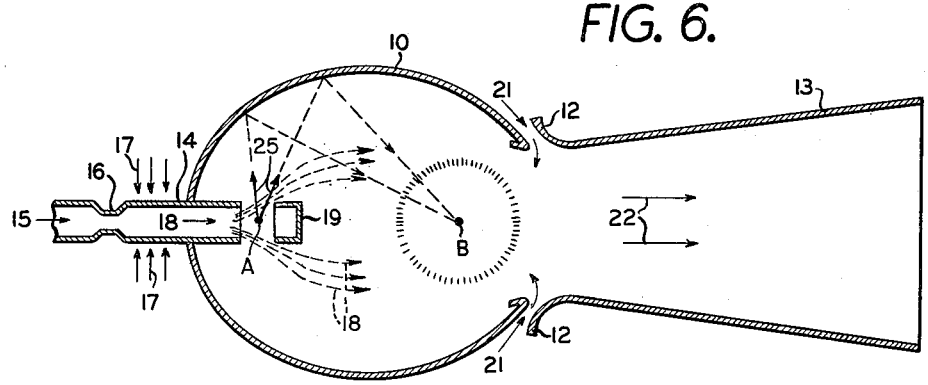
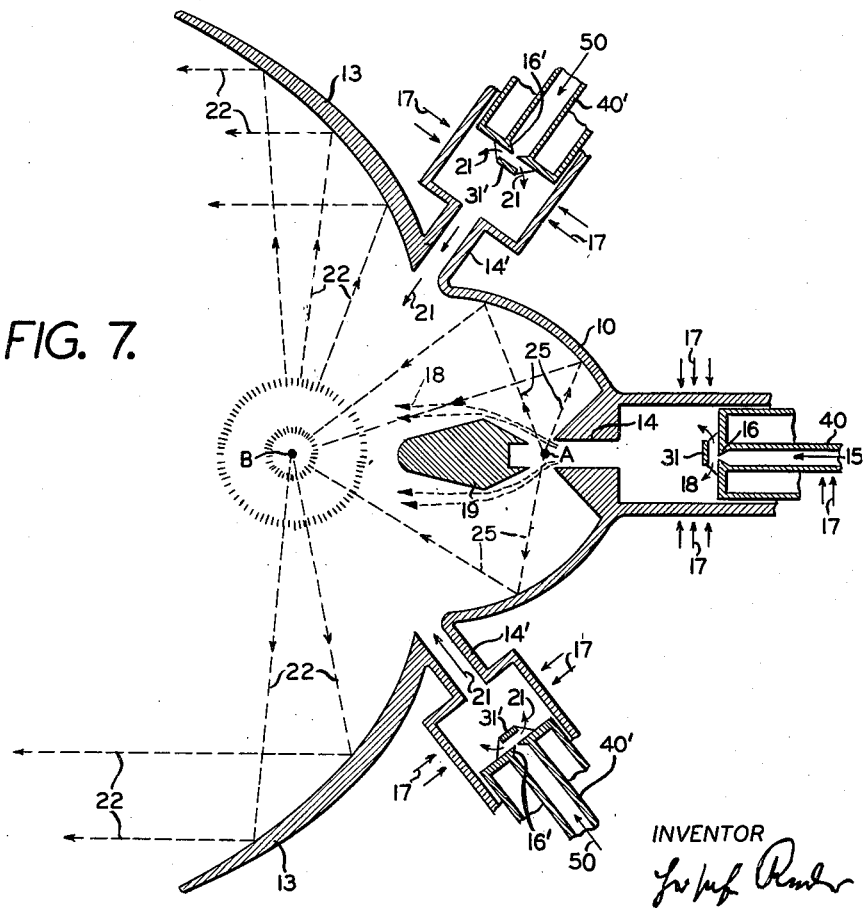

United States Patent Office 3,005,310
Patented Oct. 24, 1961

3,005,310
PULSE JET ENGINE
Joseph Reder, also known as Josef Reder, Wiesloch, Heidelberg, Germany, assignor of thirty-three and one-third percent to Bernard Olcott and Associates, Fort Worth, Tex., and sixty-six and two-thirds percent to AB. Alex Pedersen, Stockholm, Sweden, a corporation of Sweden
Filed May 1, 1956, Ser. No. 581,947
14 Claims. (Cl. 60—35.6)

This invention relates to gas stream producers which generate a high velocity mass flow of hot gas in a desired direction. Particularly, this invention is directed to improved and simplified engines utilizing high frequency pulsating combustion for high efficiency conversion of fuel energy to dynamic energy of generated gas in tuned resonant systems.

One object of this invention is to produce more efficient and more useful pulse jet engines by utilizing higher frequency combustion in new and novel gas stream producers.

Another object of this invention is to decrease the noise objection of gas stream producers and pulse jet engines.

Another object of this invention is to improve the thermal efficiency of pulse jet engines by producing higher pressure peaks and more powerful shock waves during combustion.

Another object of this invention is to improve the simplicity and reduce the maintenance effort and expense of pulse jet engines by eliminating mechanical fuel injectors and mechanical vibrating air inlet valves.

Another object of this invention is to provide an improved aerodynamic unidirectional air inlet valve which will operate up to and including the supersonic frequency range in proper phase and timing with the pulsating combustion.

Another object of this invention is to provide a new and novel non-mechanical fuel injection system which will operate up to and including the supersonic frequency range in proper phase and timing with the pulsating combustion.

Another object of this invention is to prepare the vaporized fuel and mixture of vaporized fuel and intake air in a new and novel manner so that pulsating combustion can be efficiently sustained at frequency rates up to and including the supersonic range.

It is known and proved in the established art to date that in a state of high frequency combustion, fuel will release more energy, per unit volume, per unit time, than the value as measured in a Bunsen burner flame as employed in the usual type of calorimeter. In the prior and present art, pulsating combustion has been utilized in pulse jet engines having combinations of vibrating mechanical or aerodynamic valves and mechanical fuel injectors. These engines operate in the frequency range of 40 to 250 cycles per second with attendant serious noise problems and high consumption of fuel. Great difficulties have been experienced when frequencies above 250 cycles were attempted. As the frequency is increased, the problems associated with high speed mechanical fuel injectors and high speed mixing of vaporized fuel with intake air prior to combustion become overwhelming. Even though aerodynamic valves have replaced mechanical vibrating valves of early engines, the remaining problems have placed a low ceiling on the frequency employed in practical and useful pulse jet engines. The usefulness of such resulting engines has been limited by mechanical wear, high fuel consumption and very irritating low frequency noise.

This invention will disclose a new high frequency pulse jet engine construction in which the hot combustion chamber has a characteristic physical resonance frequency equal to the desired combustion frequency. The vaporized fuel injecting system is a resonant chamber having a characteristic physical resonance frequency equal to the combustion chamber frequency and the pulsating of the vaporized fuel into the combustion chamber is automatically excited by the intermediate detonations. Intake air is admitted into the combustion chamber through unidirectional aerodynamic valves which offer a high resistance to the reverse flow of exhaust gases at the combustion frequency. The intake air turbulently mixes with the vaporized fuel prior to ignition. The ignition is caused by either reflections of the prior detonation from the hot combustion walls, the hot residue combustion products, or the high concentration of shock wave pressures. The products of combustion in an embodiment of the invention are exhausted through resonance tubes or chambers tuned to the combustion frequency. Pulsating combustion is sustained by the intermittent pressure peaks of the detonations self actuating the injection of the vaporized fuel, the intake of the combustion air, the mixing of the intake air with the vaporized fuel, the ignition, and finally the exhaust of the products of combustion. The top frequency of this new pulse jet engine is not limited by any mechanical fuel injector nor any mechanical vibrating valves. However, above 4,000 cycles per second, the mixing of the intake air with the vaporized fuel may not become complete over the entire combustion chamber volume prior to the detonation because of the extremely short interval of mixing time at this high frequency. Also the structure of the vapor fuel molecules may be too complex for rapid combustion under such high frequency conditions.

It is an aspect of this invention to increase the practical combustion frequency up to and including the supersonic range by presubjecting the fuel to heat and pressure and then by vigorously vibrating the vaporized fuel molecules with the intake air molecules prior to ignition and at a frequency rate higher than the combustion frequency. The imparting of this higher fuel vibration frequency can be accomplished by positioning high frequency generating devices of the Hartmann or Galton type in the close proximity of the end of the resonant vaporized fuel tube in the combustion chamber. Such vibrating of the vaporized fuel molecules will not only greatly improve the combustible mixture but it can also break down complex molecule structures into simpler components for more rapid combustion.

The higher frequency combustion, especially under conditions of still higher frequency mixing of the vaporized fuel with the intake air prior to detonation, will produce higher energy output as a result of the higher compression pressure peaks and the attendant higher thermal efficiency. The resulting high frequency noise will be less disturbing than the low frequency noise of the presently known pulse jet engine and in the ultimate, the noise will become inaudible when the combustion frequency is increased to the supersonic realm.

Another object of this invention is to overcome falling air inlet efficiency as the combustion frequency is increased by using a new and novel form of air inlet valve which uses external pressure pulses to force the injection of intake air into the combustion chamber as required to sustain efficient high frequency combustion. This is accomplished by using two identical combustion chambers having specially shaped aerodynamic intake valves which are not 100% unidirectional. The two engines comprising the two combustion chambers are coupled and aligned on a common axis, oppositely directed, with their intake aerodynamic valves close to each other. For such an arrangement, the small amount of shock wave detonation in one engine which escapes in the reverse direction through its unidirectional valve will aid the forcing of inlet air into the other pulse jet engine aerodynamic intake valve. In order to sustain the combustion in both engines, it becomes necessary to maintain the proper phase relationship between the detonations in the two engines as well as to maintain the frequency of the two combustion chambers exactly equal.

Another object of this invention is to provide a new and novel means to operate two pulse jet engines at exactly the same frequency and in 180° phase relationship to each other. This is accomplished in an embodiment of this invention by coupling the two combustion chambers and fuel injecting chambers with a tuned resonance tube.

Another object of this invention is to provide a new and novel high frequency resonator to mix the vaporized fuel and the intake air at a higher frequency than the combustion frequency. This is accomplished by positioning the end of the combustion chamber resonant coupling tube in proper physical relationship to the discharge end of the vaporized fuel injection tube in the combustion chamber.

Another object of this invention is to provide a propeller made integral with and driven by a pulse jet engine of new and novel design so as to offer a low and medium speed aircraft application with high engine efficiency.

Another object of this invention is to provide a high frequency pulse jet engine of new and novel design in which the center of the combustion zone is displaced from the point of vaporized fuel injection. This is accomplished by employing a combustion chamber which is ellipsoidal in shape.

Another object of this invention is to provide a high frequency pulse jet engine of new and novel design for very high frequency combustion in the substratosphere and in outer space. In this design, a reflector is used for the exhaust system.

Another object of this invention is to provide a new and novel pulse jet device for general heating.

FIGURE 6 is a cross-sectional view of a high frequency pulse jet engine with an ellipsoidal combustion chamber.

FIGURE 7 is a cross-sectional view of a very high frequency pulse jet engine for use in the substratosphere and outer space.

Figure 1:
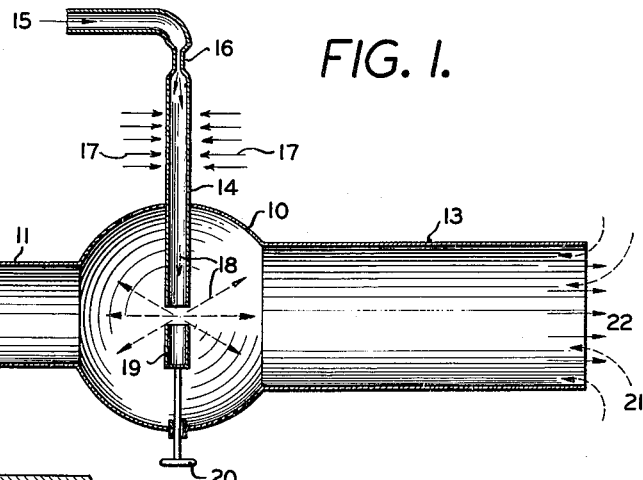
FIGURE 1 is a cross-sectional view of a resonant pulse jet engine.
Figure 2:
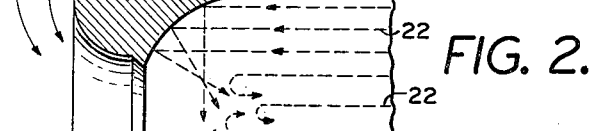
FIGURE 2 is a cross-sectional view of a high frequency aerodynamic unidirectional air intake valve.

Referring to the drawings in detail, wherein like characters or reference denote corresponding parts of FIGURES 1, 2, 3, 4, 5, 6, and 7, 10 represents a hot combustion chamber wall and 11 a short air inlet section to the combustion chamber. The other end of section 11 has a unidirectional aerodynamic valve 12 open to ambient air. An exhaust section 13 is also connected to the combustion chamber 10. Into the combustion chamber 10 projects a fuel vaporizing tube 14, at the intake end of which is connected a liquid fuel 15 under high pressure through a throttle section 16. In FIGURE 1, the characteristic physical resonance frequency of the combustion chamber 10, the exhaust tube 13 and the vaporizing fuel injector tube 14 are all tuned to the desired combustion frequency. In tuning these parts, due consideration is given to using convenient workable fractionals or multiples of the fundamental wavelength for the tuning of any of the components in resonance. Such choice of tuning will permit using most practical physical dimensions. The throttle section 16 will tend to vaporize the liquid fuel 15 as it enters fuel tube 14. In order to assist this vaporizing process, heat 17 is applied to this tube, preferably from some waste heat source. Positioned in the path of the flow of vaporized fuel 18 and located in the combustion chamber near the end of fuel injector tube 14 is a high frequency Galton or Hartmann resonator cup 19. The position of this cup 19 is adjusted by means of screw 20 so that the fuel vibration frequency is equal to or higher than the combustion frequency and if desired, the vibration frequency can be $n$ times the combustion frequency, where $n$ is 1, 2, 3 . . . $n$. By employing a higher frequency for the mixing of the vaporized fuel 18 and the inlet air 21 which has entered through the inlet valve 12, a very good mixture prior to ignition is obtained with resulting improvement in combustion efficiency, especially at high frequencies. Ignition at the combustion frequency will occur from the shock wave reflection of the prior detonation from the combustion walls, from the hot residue combustion products, or from the concentration of ultrasonic shock waves produced by the Galton or Hartmann resonator 19. The path of least resistance for the detonation wave and the following pulse of hot exhaust gases 22 is to the right and out the tuned exhaust pipe 13. The movement of hot exhaust gases 22 to the left and through the air inlet valve 12 in the reverse direction to inlet air 21 is impeded for a number of reasons: the valved section is enveloped with cool dense intake air, the inlet area is smaller than the exhaust area at the ambient end of tube 13 and, most important, due to the shape of the inside wall 12a of the inlet valve 12. By designing the shape of this inside wall 12a to have a converging angular contour with a sharp exit shoulder, the wave reflections from this valve contour will interfere with the basic traveling wave and flow and thereby cause partial cancelation. The aerodynamic valve 12 as shown in FIGURE 1 will allow but a small percentage of the exhaust gases 22 to escape in the undesired direction for the reasons given above. The aerodynamic valve as shown in FIGURE 2 can be more nearly unidirectional for a specific high frequency range. In this design, the inside wall 12a is shaped converging concave to cause nearly complete interference and cancelations with the oncoming pressure pulse. The outside wall of the air intake valve which is designated as 12b is rounded smooth and covex so as to aid the flow of cool intake air 21 when the pressure in the combustion chamber becomes negative in the interval between detonations. Very little intake air 12 is drawn in from the ambient end of exhaust tube 13 during this negative pressure instant in the combustion chamber 10 because the cool and dense inlet air quickly traverses the short inlet tube 11 and destroys the vacuum in the combustion chamber.

As liquid fuel 15 is feeding through the throttle section 16 and into the tuned vaporization tube 14 with a higher pressure than the peak pressure transmitted to the throttle section 16 from the detonation in the combustion chamber 10 as a consequence of the tuned length of chamber 14, the fuel flow is modulated at the combustion frequency rate. After this modulated or pulsed liquid flow is vaporized by the action of 16 and 17, the pulsating vapor is injected into the combustion chamber 10 at the combustion frequency and in the proper phase relationship by the proper tuning of the vaporizing tube 14. Pulsating combustion will be sustained as the positive and negative pressure swings in the combustion chamber due to intermittent detonation induces fuel injection, air intake, mixing, ignition and exhaust, all in resonance and in proper phase relationship.

Figure 3:
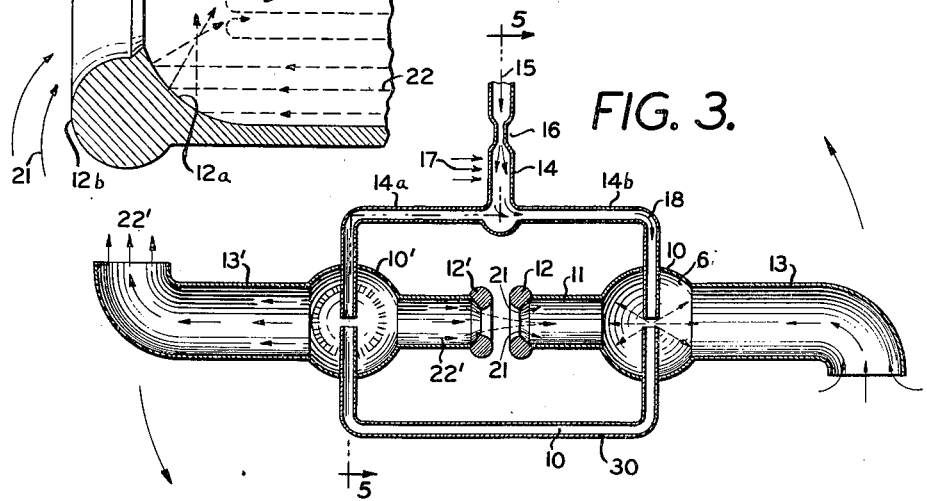
FIGURE 3 is a cross-sectial view of two resonant pulse jet chambers operating at the same frequency and in 180° phase relationship to each other.
Figure 4:
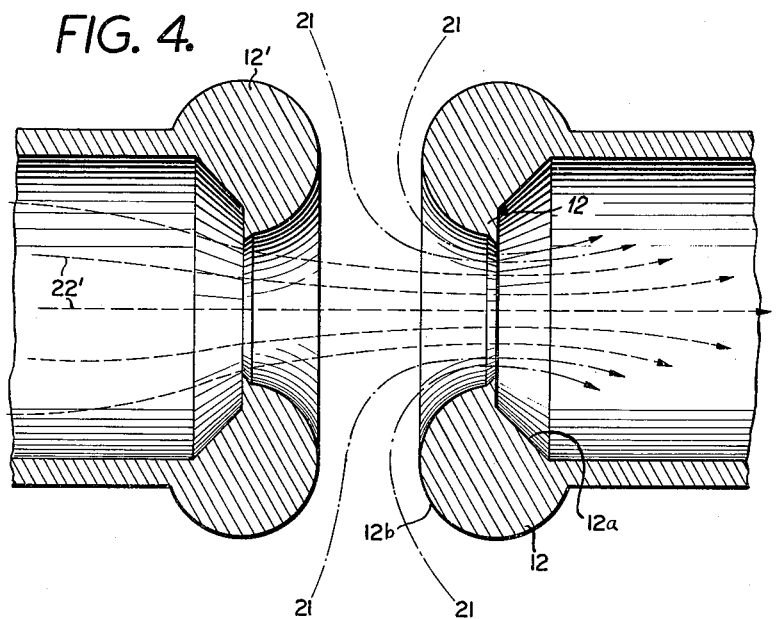
FIGURE 4 is an enlarged view of the aerodynamic air intake valves of FIGURE 3.

In FIGURE 3 there is shown two identical pulse jet engines coupled together at their air inlet sections, each of the engines being similar to the engine of FIGURE 1 except for the device for generating the high frequency vaporized fuel vibrations. Both engines are firing at the same combustion frequency and in 180° phase relationship. The pulse jet engine on the right is midway between detonations and the vacuum in the combustion chamber 10 is drawing in vaporized fuel 18 and intake air 21. The pulse jet on the left has just detonated and most of the exhaust gases 22' are leaving the end of the exhaust tube 13'. However, a small percentage of the exhaust gases 22' is escaping through air inlet 12' in the reverse direction due to the fact that valve 12' is not 100% unidirectional. This escaping exhaust pulse 22' is utilized to force intake air 21 through air inlet valve 12. By such a means, the efficiency of the engine is maintained at very high combustion frequencies by this supercharging effect. Without a supercharging assist, the short interval of high vacuum in the combustion chamber at very high combustion frequencies does not provide enough time for the intake air to accelerate and to travel the length of the air intake tube 11 in order to reach the combustion chamber 10. The vaporizing fuel tube 14 is divided into two branches, 14a and 14b, so that first one and then the other combustion chamber is charged with vaporized fuel as induced by the intermittent vacuum between detonations. The length of the vaporizing tube 14 and each of the branches 14a and 14b are tuned to the combustion frequency by employing physical lengths of convenient fractional or multiple wavelengths. In order to maintain equal combustion frequencies and 180° relationship, a resonant tube 30 tuned to the combustion frequency by employing a physical length of a convenient fractional or multiple wavelength is used to couple the combustion chambers 10 and 10'. The ends of this resonant tube 30 are made to serve another needed purpose by placing them opposite to and selectively spaced from the ends of the vaporized fuel injection tubes 14a and 14b so that they will act as high frequency generators to disperse the fuel vapor 18 in the intake air 21 at the same or higher frequency than the combustion frequency. The fuel mixing frequency is adjusted by a physical means, not shown, to adjust the distance between the ends of tube 30 and the tube ends of 14a and 14b. FIGURE 4 is an enlarged view of the aerodynamic inlet valves 12 and 12' of FIGURE 3. By providing smooth convex surfaces for the flow of cool intake air 21 and sharp converging angular surfaces with a sharp protruding shoulder for the reverse exhaust gas flow 22, the valves have more flow resistance in one direction than in the other. The frequency of the combustion has a marked influence on the dynamic two flow resistances.

Due to the very high exhaust gas exit velocity of pulse jet engines, their most efficient application is for high speed aircraft. However, an efficient engine for low and medium speed aircraft can be constructed by using the high exhaust gas velocity to turn a propeller through tip orifices. The design of efficient propellers for low and medium speed aircraft is known art. Further, a duct encircling the revolving propeller can be used to increase propulsion by taking advantage of the principle of the ducted fan. Hence the two coupled pulse jet engines of FIGURE 3 can be constructed into the hub of a propeller with provision for air intake at the hub. The exhaust tubes 13 and 13' are channeled through the propeller blades to tip nozzles so that the reaction forces will turn the propeller. As the propeller r.p.m. increases, the centrifugal forces will assist the discharge of exhaust gases for higher efficiency. Also, the forward motion of the propeller hub can be used to force intake air into the engines for greater efficiency.

Figure 5:
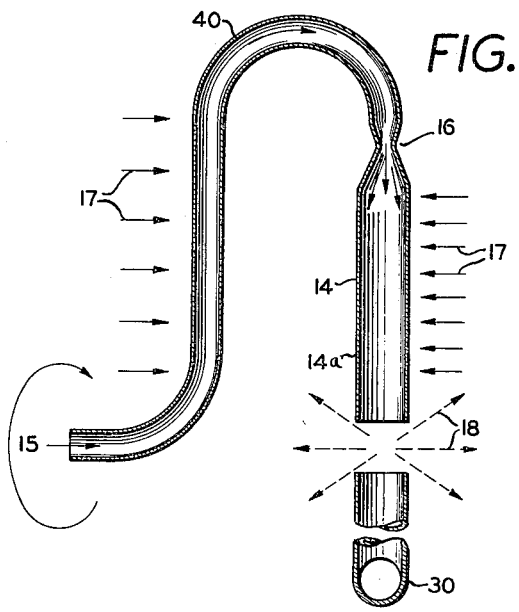
FIGURE 5 is a cross-sectional view of the resonant vaporizing fuel injector tube of FIGURE 3 taken substantially on line 5—5.

While an intermittent fuel injector of the mechanical type is not required in this invention, it is necessary to provide fuel at a high pressure to the throttle section 16 in the vaporizing fuel injector tube 14. FIGURE 5 shows an arrangement for producing fuel pressure without using a mechanical pump It is a cross-sectional view taken substantially on line 5—5 of FIGURE 3. In FIGURE 5, the vaporizing fuel injector tube 14 is revolving about the propeller axis of rotation A—A' with its center line perpendicular thereto. A fuel tube 40 connects the throttle section 16 with a source of liquid fuel 15 located on the axis A—A'. When the assembly is rotating, the difference in the weights of the liquid fuel in tube 40 and the vaporized fuel in chamber 14 will cause the centrifugal forces acting on these masses to produce a high pressure in the liquid fuel line as it enters the throttle section 16. Heat 17 applied from a waste heat source to the liquid line 40 and to the chamber 14 will greatly assist the complete vaporization of the liquid fuel.

In FIGURE 6, the combustion chamber 10 is an ellipsoid with two points of focus, A and B, fuel injector tube 14 and resonator cup 19 are positioned so that the center of the point of vaporized fuel injection is at focus A. As liquid fuel 15 under pressure passes throttle section 16, it becomes vaporized fuel 18. Resonator cup 19 under the influence of the high pressure pulsating vaporized fuel 18 generates a very high frequency train of ultrasonic waves 25. The fuel vapor 18 issues from the end of the fuel vaporization tube 14 as a vapor cloud which passes around resonator cup 19 and advances towards focus point B. The train of ultrasonic waves 25 generated by the resonator cup 19 are concentrated on focus point B by the ellipsoidal wall of the combustion chamber 10. During the negative pressure in the combustion chamber between detonations, intake air 21 will pass through intake section 12 and will be directed towards focus point B. By a selected design of the ellipsoidal combustion chamber 10 which takes into account the velocity of the fuel cloud 18, the velocity of the intake air 21, the velocity of the ultrasonic waves 25 and the length of the respective paths that each component must follow, all three components will reach focus point B at the same time. On approaching focus point B, the intake air 21 will mix violently with the fuel vapor 18 under the influence of the ultrasonic waves 25 to form a good combustible mixture. Detonation will occur at point B due to the high concentration of very high frequency waves at this point. Part of the reflected detonation wave originating from point B will reflect from the ellipsoidal combustion chamber wall and back to point A. This pressure front will excite the pulsing of the vaporized fuel from the injector tube 14 into the combustion chamber in the manner explained previously. The products of combustion 22 will be exhausted through exhaust tube 13. The air intake section 12 is shaped and positioned as shown so that very little, if any, of the detonation wave escapes through section 12 in the reverse direction.

In FIGURE 7 is shown an extremely high frequency resonant pulse jet engine operating in the substratosphere or in outer space where there is insufficient ambient air for combustion and the absolute ambient pressure is very low. Combustion chamber 10 is an ellipsoid with two points of focus, A and B. As in FIGURE 6, the fuel injector tube 14 and resonator cup 19 are positioned so that the center of the point of vaporized fuel injection is at focus A. Liquid fuel 15 under pressure in tube 40 will be vaporized into fuel vapor 18 as it passes through throttle section 16. Heat 17 will also assist this process. A disk 31 in the path or vaporized fuel 18 will prevent any liquid fuel 15 from slugging into combustion chamber 10 as a result of the very small physical dimensions of this extremely high frequency pulse jet engine. The fuel injector tube is tuned to the combustion frequency, utilizing either multiples or fractionals of the fundamental combustion frequency, by sliding tube 40 in chamber 14. The resonator cup 19 under the influence of the high pressure pulsating vaporized fuel 18 will generate a very high frequency train of ultrasonic waves 25. The fuel vapor 18 issues from the end of the vaporization tube 14 as a vapor cloud which passes around the resonator cup 19 and advances towards the focus point B. The train of ultrasonic waves 25 generated by the resonator cup 19 are concentrated on the focus point B by the ellipsoidal wall of combustion chamber 10. Oxygen for combustion will be supplied by liquid oxygen 50 supplied under pressure in line 40′ which will gasify as it passes through throttle section 16′. The gaseous oxygen 21 will be deflected by disk 31′ and will enter the injector tube 14′. This injector tube is tuned to the combustion frequency, utilizing either multiples or fractionals of the fundamental combustion frequency, by sliding tube 40′ in chamber 14′. Oxygen 21 for combustion will be pulsed into the combustion zone in the same manner that fuel vapor 18 is pulsed into the combustion chamber. By a selected design of the ellipsoidal combustion chamber 10 which takes into account the velocity of the vaporized fuel cloud 18, the velocity of the intake oxygen 21, the velocity of the ultrasonic waves 25 and the respective lengths of paths that each component must follow, all three components will reach the focus point B at the same time. As both the vaporized fuel 18 and the oxygen 21 approach point B they are violently mixed together by the ultrasonic waves 25 generated by the action of resonator cup 19. Detonation of the good combustible mixture occurs as the extremely high frequency waves are concentrated at point B. Part of the resulting detonation wave will excite the pulsing of the gaseous oxygen and the vaporized fuel as the pressure waves reach chambers 14′ and 14 respectively in proper phase and timing for the next detonation. The major portion of the detonation wave and products of combustion 22 will reflect from parabolic surface 13 to produce thrust. This parabolic reflecting surface is positioned so that its focus point coincides with focus point B of ellipsoid 10.

In the designs shown in this invention, advantage can be taken of using water spray in the combustion chamber or mixing water with the liquid fuel to increase the efficiency of the combustion. The water injection will tend to cool the high frequency generating devices 19, the ends of tube 30 and the fuel vaporizing tube 14 projecting into the hot combustion chamber.

The description of the invention with reference to preferred embodiments illustrated for purposes of disclosure is not to be considered limiting and it is accordingly to be understood that applicant reserves the right to all such changes and modifications as fall within the principles of this invention and the scope of the appended claims as well as combinations with the known art.

What is claimed is:

1. An energy converter comprising an intermittently detonating combustion chamber, fuel injector having means for intermittently injecting vaporized fuel at the intermittent detonating rate into said intermittently detonating combustion chamber and means for separately supplying to said chamber an oxidizer to mix with the vaporized fuel, said fuel injector comprising a tube having its discharge end disposed within the combustion chamber, a pressure reducing throttle section formed in the inlet end of said tube, and a member having an ultrasonic wave generating cavity positioned in proximity to and opening towards the discharge end of said tube, the inlet of the throttle section receiving liquid fuel at a substantially constant pressure selected to vaporize the fuel discharging into said tube and to impinge a portion of the discharging vaporized fuel from said tube upon the cavity in said member for generating ultrasonic waves at a frequency higher than the detonating frequency, said tube having a selected length so that the pressure variations produced by the intermittent detonations within the combustion chamber will produce a standing wave in the vaporized fuel contained in said tube having a fundamental frequency corresponding to the detonation rate, whereby the vaporized fuel will be pulsed at the detonation rate upon discharge from the said tube and the individual vapor fuel particles will be vigorously vibrated with the oxidizer at the ultrasonic wave rate.

2. An energy converter according to claim 1 wherein means are provided to heat said tube whereby the vaporization of the fuel is assisted.

3. An energy converter according to claim 1 wherein said member is a cup.

4. An energy converter according to claim 1 wherein said member is a tubular member adapted to contain a gaseous fluid and having a selected length to produce standing waves in the gaseous fluid at the detonating frequency rate.

5. A pulse jet engine which comprises an ellipsoidal combustion chamber adapted to contain a gaseous product of combustion and having an exhaust section for the intermittent discharge thereof, a detonating generator for intermittently generating said product of combustion and originating sound waves at a first focal point of the combustion chamber, said detonating generator comprising means controlled by said sound waves generated at said first focal point for pulsing vaporized fuel at the detonation rate at a second focal point of said combustion chamber and flowing the vaporized fuel pulses toward said first focal point, means controlled by said fuel pulses to generate ultrasonic waves at said second focal point at a frequency higher than the frequency of said sound waves, and means for supplying oxygen to the region adjacent said first focal point to mix with a vapor fuel pulse by the action of the ultrasonic waves prior to the intermittent detonations thereat whereby the vaporized fuel will be pulsed at the detonation rate upon leaving said vaporized fuel pulsing means, mix with the oxygen at the ultrasonic rate upon approaching the first focal point before detonation and subsequently be detonated upon the concentration of ultasonic waves at said first focal point in proper timing with the pressure variations thereat.

6. A pulse jet engine according to claim 5 wherein said vapor pulsing means comprises a tube disposed with its discharge end adjacent said second focal point and pointed toward the said first focal point, a pressure reducing throttle section formed in the inlet end of said tube and means for supplying liquid fuel at a substantially constant pressure to the inlet of said throttle section at a selected pressure to vaporize the fuel discharging into said tube, and said ultrasonic wave generating means comprises a member having an ultrasonic wave generating cavity positioned in proximity to and opening towards the discharge end of said tube.

7. A pulse jet engine according to claim 6 wherein said member is a cup.

8. A pulse jet engine according to claim 6 wherein said member is a tubular member containing a gaseous fluid and having a selected length to produce standing waves in the gaseous fluid at the detonation rate.

9. A pulse jet engine according to claim 8 and having two identical combustion chambers, each chamber having identical detonating generators and being connected at opposite ends of said tubular member.

10. A pulse jet engine according to claim 5 wherein said exhaust section includes a reflector having a paraboloidal surface disposed with its focal point in coincident position with said first focal point of the combustion chamber.

11. A pulse jet engine which comprises an ellipsoidal combustion chamber, a tube disposed with its discharge end adjacent a first focal point of said chamber and pointed towards a second focal point of said chamber, a pressure reducing throttle section formed in the inlet end of said tube, means supplying liquid fuel at a substantially constant pressure to the inlet of said throttle section, a member having an ultrasonic wave generating cavity positioned in proximity to and opening towards the discharge end of said tube and means for supplying oxygen to the region adjacent said second focal point.

12. A pulse jet engine according to claim 11 including a reflector having a paraboloidal surface disposed with its focal point in coincident position with said second focal point of the combustion chamber.

13. A pulse jet engine according to claim 11 wherein said oxygen supplying means is a duct open to the atmosphere at its inlet end which offers greater resistance to the flow of gases from the chamber to the atmosphere than to the flow of air from the atmosphere to the chamber.

14. A pulse jet engine according to claim 11 wherein said oxygen supplying means includes a second tube disposed with its discharge end pointed towards said second focal point, a pressure reducing throttle section formed in the inlet end of said second tube, means supplying a liquid oxidizer at a substantially constant pressure to the inlet of the pressure reducing throttle section associated with said second tube and a second member having an ultrasonic wave generating cavity positioned in proximity to and opening towards the discharge end of said second tube.

References Cited in the file of this patent

UNITED STATES PATENTS

| | | |
|---|---|---|
| 1,939,302 | Heaney | Dec. 12, 1933 |
| 2,364,987 | Lee | Dec. 12, 1944 |
| 2,465,525 | Goddard | Mar. 29, 1949 |
| 2,523,308 | Kemmer et al. | Sept. 26, 1950 |
| 2,532,554 | Joeck | Dec. 5, 1950 |
| 2,539,535 | Espenschied | Jan. 30, 1951 |
| 2,555,085 | Goddard | May 29, 1951 |
| 2,563,024 | Goddard | Aug. 7, 1951 |
| 2,581,902 | Bodine | Jan. 8, 1952 |
| 2,599,480 | Pfenninger | June 3, 1952 |
| 2,642,895 | Bertin et al. | June 23, 1953 |
| 2,727,535 | Linderoth | Dec. 20, 1955 |
| 2,745,372 | Chertoff | May 15, 1956 |
| 2,750,733 | Paris et al. | June 19, 1956 |

FOREIGN PATENTS

| | | |
|---|---|---|
| 473,531 | Canada | May 15, 1951 |
| 880,408 | Germany | June 22, 1953 |
| 673,197 | Great Britain | June 4, 1952 |